United States Patent Office 3,234,029
Patented Feb. 8, 1966

3,234,029
PREPARING A PUMPABLE SHORTENING
COMPOSITION
Charles Frederick Bruce, Whitley Bay, Northumberland, England, assignor to The Procter & Gamble Company, Cincinnati, Ohio, a corporation of Ohio
No Drawing. Filed Oct. 9, 1962, Ser. No. 229,493
Claims priority, application Great Britain, Oct. 17, 1961, 37,253/61
2 Claims. (Cl. 99—123)

This invention relates to a process for preparing a shortening composition which is pumpable at temperatures from 70° F. to 80° F.

Shortening agents prepared by blending fats such as hydrogenated marine oils, hydrogenated or unhydrogenated vegetable or animal fats, are well known. Similar shortening agents containing emulsifying agents such as partial glycerides of fatty acids which give the products improved performance particularly in the production of cakes containing more sugar than flour, are also well-known. These shortenings have, hitherto, been prepared in the form of plastic fats which have been found to give the most satisfactory performance in the baking of cakes.

In large scale commercial bakery operations, and particularly in the preparation of cake batters in a continuous process, the plastic shortenings present difficulties in handling as they cannot be poured or pumped and so are not suitable for being added to cake batters and the like continuously and at controlled rates.

Various fluid shortening compositions have been proposed to overcome this difficulty. These compositions are usually suspensions of solid fats, and optionally high-ratio emulifiers, in normally liquid oils, and while they overcome the handling difficulties they have disadvantages in that the normally liquid vegetable oils which make up a large proportion of the compositions are more costly than, for example, the hydrogenated marine oils, or the animal fats such as lard and tallow which can be used in plastic shortening compositions. The known fluid shortenings may also have a disadvantage in performance as compared with plastic shortenings as they tend to give rise to the separation of liquid oil from the batter or dough.

It has now been found that a shortening composition which has the cost and performance advantages of plastic shortening, but is sufficiently fluid at 70° F. to 80° F. to be pumpable and capable of being handled by commercial bakery equipment, can be prepared by suitable selection of the ingredients and by suitable processing to ensure that the fat blend is obtained as a pumpable composition.

According to the invention a process for preparing a shortening composition which is pumpable at 70° F. to 80° F. comprises preparing a mixture of the following ingredients (1) one or more triglyceride fats selected from hydrogenated marine oil and hydrogenated and unhydrogenated vegetable and animal fats, (2) from 3% to 6%, by weight of the composition, of one or more normally solid triglycerides of substantially saturated fatty acids, (3) from 0.5% to 8%, by weight of the composition, of one or more propylene glycol monoesters of substantially saturated fatty acids and/or one or more lactic acid esters of monoglycerides of substantially saturated fatty acids, and (4) from 0.05% to 5%, by weight of the composition, of one or more partial glyceride esters of substantially saturated fatty acids; all the substantially saturated fatty acids mentioned above having from 16 to 22 carbon atoms in the molecule and ingredients (1) and (2) being so selected that a mixture of them has solids content index (as hereinafter defined) in the ranges 15–25 at 60° F., 10–16 at 80° F., and 6–10 at 92° F.; adjusting the temperature of the mixture so that all the ingredients are liquid; rapidly chilling the resulting liquid mixture to produce a cloud of crystal nuclei; and thereafter slowly cooling the resulting nucleated mixture with agitation to a temperature not higher than 80° F.

The slow cooling is preferably carried out at a rate of 2–5° F. per hour, and the temperature to which such cooling brings the composition is preferably in the range 70–80° F.

The composition may preferably include a further ingredient (5), this being up to 2%, by weight of the composition, of substantially saturated free fatty acids having from 16 to 22 carbon atoms in the molecule.

The solids content index (S.C.I.) is a measure of the solid phase fat in a mixture containing solid and liquid phase fat. S.C.I. may be determined by the test described in The Journal of the American Oil Chemists' Society, March 1954, volume XXXI, pages 98–103. For the purpose of this invention the method of determining S.C.I. has been slightly modified from that published in the above issue of the Journal of the American Oil Chemists' Society, to enable the test to be carried out in a shorter time while giving a very useful result which does not differ greatly from that obtained by the above published method. The modifications are:

(1) The fat is held at 80° F. for 30 minutes, instead of until all volume changes at 80° F. have ceased.
(2) The fat is held for 30 minutes at the temperature at which the S.C.I. is desired instead of until all volume changes have ceased.

The triglyceride fats of ingredient (1) are selected from those fats normally used in the formulation of plastic shortenings. These include hydrogenated whale and fish oils, vegetable oils such as groundnut oil, cottonseed oil, soyabean oil, palm oil (which may be partially hydrogenated if desired), and animal fats such as lard or tallow (which may be partially hydrogenated if desired). The oil blend is such that the solids content index of the mixture of ingredients (1) and (2) is that of a typical plastic shortening, which is in the S.C.I. range quoted above.

The normally solid triglycerides of ingredients (2) may be derived from any suitable suorce. Suitable sources are, for example, soyabean oil, groundnut oil and palm oil which have been hydrogenated to a high degree, preferably to an iodine value of less than 10.

The ingredients (3), (4) and (5) may be derived from those fats which are preferred for ingredient (2) but other substantially saturated fats such as hydrogenated fish oil may be used.

When ingredient (3) is a propylene glycol monoester, a very convenient way of obtaining ingredients (3), (4) and (5) in admixture in proportions such that the mixture is suitable for use in shortening compositions of the invention is to transesterify a suitable hydrogenated fat with, for example, about half its own weight of propylene glycol using an alkaline esterification catalyst, in known manner. The hydrogenated fat is suitably normally solid substantially saturated triglyceride ester such as may be used in ingredient (1).

Similarly, when ingredient (3) is a lactic acid ester of a monoglyceride, a very convenient way of obtaining ingredients (3), (4) and (5) in admixture in proportions such that the mixture is suitable for use in the shortening composition of the invention is to transesterify a suitable hydrogenated fat with excess of glycerine in known manner so as to produce a product containing a major proportion of monoglyceride, removing the unreacted glycerine by vacuum distillation and then esterifying the monoglyceride with lactic acid, in known manner.

The propylene glycol monoesters of fatty acids may be replaced, partly or wholly, by lactice acid esters of monoglycerides of $C_{16}$—$C_{22}$ fatty acids without substantially affecting the properties of the composition. Replacement of the porpylene glycol monoesters by other known "high ratio" emulsifiers such as mono- and diglycerides of fatty acid gives a product which does not have the desirable properties of the compositions of this invention.

It is essential that the compositions be cooled from the completely liquid state to not more than 80° F. by the two stage process described above. The first stage of rapid chilling is preferably from the liquid state to 88° F.–95° F.; it should most suitably be carried out in less than 10 minutes and preferably in less than one minute. This chilling may conveniently be carried out by means of a scraped wall heat exchanger such as is commonly used in chilling fat compositions. The operating conditions should preferably be such that the temperature of the composition leaving the heat exchanger is in the range of 88° F.–95° F. and the residence time of the composition in the heat exchanger is less than about one minute. The rapid chilling process produces a cloud of minute crystal nuclei which are believed to be crystal nuclei of the normally solid triglycerides of ingredient (2). The subsequent slow cooling with agitation leads to the crystallisation of the remaining high melting solids and intermediate melting solids in a crystal form such that the crystals remain in suspension in the liquid oil and do not interlace to form a lattice such as occurs in plastic fats cooled by conventional processes. If the fat composition is slowly cooled from the liquid state to below 80° F. without the nucleation stage, the product obtained is fluid but is grainy due to the presence of large crystals, and has inferior baking performance. If the oil is nucleated by rapid chilling from the liquid melt to 88° F.–95° F. then cooled quickly (20° F. per hour) to 70° F.–80° F., the product has good baking performance, but is very viscous and cannot be pumped.

The products of the invention are easily pumpable when freshly prepared and, if stored at 70° F.–80° F., remain pumpable over long periods, for example one month or more. In certain instances there may be a tendency for the product to become somewhat thicker on storage, but this can be avoided if the product is agitated occasionally, e.g. for a short period each day, during storage.

The products of the invention may have the baking properties of conventional plastic shortenings or of "high ratio" shortenings according to the proportions of ingredients (3) and (4) in the composition. Generally speaking compositions containing 4% or less of ingredient (3) will not have "high ratio" properties and "high ratio" properties become evident and will increase as the proportion of ingredient (3) is increased from 4% to 8%. Similarly, increasing the proportion of ingredient (4) from 0.5% to 5% will also increase the "high ratio" properties of the product.

*Example 1*

A blend was prepared of:

65 parts by weight of a hydrogenated mixture of equal parts of whale oil and herring oil (iodine value 76)
9 parts by weight of unhydrogenated soyabean oil
12 parts by weight of unhydrogenated palm oil
6 parts by weight of hydrogenated soyabean oil (iodine value 8)

The blend had S.C.I. as follows:

19 at 60° F.
15 at 80° F.
9 at 92° F.

To this mixture was added 8 parts by weight of superglycolated fat of the following approximate composition:

| | Percent |
|---|---|
| Propylene glycol monoester of fatty acid (with some triglyceride) | 64 |
| Propylene glycol di-ester of fatty acid (with some diglyceride) | 22 |
| Monoglyceride | 12 |
| Free fatty acid | 2 |

The superglycolated fat was prepared as follows:

3,200 parts by weight of hydrogenated soyabean oil (iodine value 8) and 1,600 parts by weight of propylene glycol were heated together, in the presence of 9 parts by weight (100% basis) of caustic soda as catalyst, for 1 hour at 350° F. and atmospheric pressure. After completion of the reaction the catalyst was neutralised by the addition of 7.5 parts by weight (100% basis) of phosphoric acid and the unreacted glycol was removed by vacuum distillation.

The blend of triglyceride fats and superglycolated fat was mixed in completely molten condition at 120° F. and was then rapidly chilled to 90° F. by passing through a conventional scraped wall freezing unit. The chilled blend was then cooled with mild agitation, at a rate of 4° F. per hour, to 75° F.

The product had a viscosity of 800 cps. at 75° F. when freshly prepared and after storage for 28 days at 75° F. had a viscosity of 4000 cps. at 75° F. (Viscosity measurements were made with a Ferranti Model PVM portable viscometer.)

The product had baking performance equal in all respects to that of a plastic "high ratio" shortening and could be pumped easily even after 28 days' storage.

*Example 2*

A blend was prepared of:

67 parts by weight of a hydrogenated mixture of equal parts of whale oil and herring oil (iodine value 76)
10 parts by weight of unhydrogenated soyabean oil
13 parts by weight of unhydrogenated palm oil
6 parts by weight of hydrogenated soyabean oil (iodine value 8)

The blend had S.C.I. as follows:

19 at 60° F.
14 at 80° F.
8 at 92° F.

To this mixture was added 4 parts by weight of lactic acid emulsifier of the following approximate composition:

| | Percent |
|---|---|
| Triglyceride | 16 |
| Diglyceride | 24 |
| Monoglyceride | 5 |
| Lactic acid ester of monoglyceride | 26 |
| Lactic acid ester of diglyceride | 24 |
| Glycerol lactate | 4 |
| Free fatty acid | 1 |

The lactic acid emulsifier was prepared as follows:

4,000 parts by weight of hydrogenated herring oil (iodine value 8) and 741 parts by weight of glycerine were heated together, in the presence of 8 parts by weight (100% basis) of caustic soda as catalyst, for 30 minutes at 340° F. under moderate vacuum. The catalyst was then neutralised by the addition of 47 parts by weight of citric acid monohydrate and the unreacted glycerine was removed by vacuum distillation.

800 parts by weight (100% basis) of lactic acid was added to the reaction mixture which was then heated for 15 minutes at 340° F. under moderate vacuum. After completion of the reaction, the unreacted lactic acid was removed by vacuum distillation and the reaction mixture was cooled and filtered.

The blend of triglyceride fats and lactic acid emulsifier was mixed in completely molten condition at 120° F. and was then rapidly chilled to 90° F. by passing through a conventional scraped-wall freezing unit. The chilled blend was then cooled, with mild agitation, at a rate of 4° F. per hour, to 75° F.

The product had a viscosity of 700 cps. at 75° F. when freshly prepared. After storage for 33 days at 75° F., with mild agitation for a period of one hour during each day, it had a viscosity of 1100 cps. at 75° F.

The product had baking performance equal in all respects to that of a conventional plastic shortening and could be pumped easily even after 33 days' storage.

*Example 3*

A blend was prepared of:

70 parts by weight of a hydrogenated mixture of equal parts of whale oil and herring oil (iodine value 76)
10 parts by weight of unhydrogenated soyabean oil
14 parts by weight of unhydrogenated palm oil
6 parts by weight of hydrogenated palm oil (iodine value 3)

The blend had S.C.I. as follows:

20 at 60° F.
15 at 80° F.
8.5 at 92° F.

95 parts by weight of this mixture were mixed with 5 parts by weight of the lactic acid emulsifier used in Example 2, mixing being carried out at 120° F. with all ingredients in completely molten condition. The mixture was then rapidly cooled to 90° F. by passing through a conventional scraped wall freezing unit. The chilled blend was thereafter cooled at a rate of 4° F. per hour, with mild agitation, to 75° F.

The freshly made product had viscosity 800 cps. at 75° F. After 24 hours storage at 75° F., without agitation, the product had viscosity 1100 cps. at 75° F. After one week's storage at 75° F. without agitation the product still remained fluid and had viscosity 2300 cps. at 75° F.

When the product was cooled below 70° F. it firmed up rapidly but this firming was reversible and fluidity was restored on raising the temperature to 75° F.

The product had baking performance equal in all respects to that of a conventional plastic shortening.

What is claimed is:

1. A process for preparing a shortening composition which is pumpable at temperatures within the ranges 70° F. to 80° F., said process comprising forming a mixture consisting essentially of the following ingredients (1) at least one triglyceride fat selected from the group consisting of hydrogenated marine oil and hydrogenated and unhydrogenated vegetable and animal fats, (2) from 3% to 6%, by weight of the composition, of at least one normally solid triglyceride of substantially saturated fatty acid, (3) from 0.5% to 8%, by weight of the composition, of at least one ester selected from the group consisting of propylene glycol monoesters of substantially saturated fatty acid and lactic acid esters of monoglycerides of substantially saturated fatty acid, and (4) from 0.05% to 5%, by weight of the composition, of at least one partial glyceride ester of substantially saturated fatty acid; all the substantially saturated fatty acids mentioned above having from 16 to 22 carbon atoms per molecule, and ingredients (1) and (2) being so selected that a mixture of them has solids content index in the ranges 15–25 at 60° F., 10–16 at 80° F., and 6–10 at 92° F.; adjusting the temperature of the mixture so that all the ingredients are liquid; rapidly chilling the resulting liquid mixture in less than 10 minutes to a temperature of from 88° F. to 95° F. so as to produce a cloud of crystal nuclei; and thereafter slowly cooling the resulting nucleated mixture with agitation for a period of from about 1.6 to about 12.5 hours to a temperature of from 70° F. to 80° F., the rate of the slow cooling being controlled at from 2° F. to 5° F. per hour.

2. A process according to claim 1 in which the shortening composition additionally includes from 1% to 5%, by weight of the shortening, of at least one substantially saturated free fatty acid.

References Cited by the Examiner

UNITED STATES PATENTS

| 2,508,393 | 5/1950 | Jaeger | 99—123 |
| 2,521,242 | 9/1950 | Mitchell | 99—118 |
| 2,846,312 | 8/1958 | Lantz et al. | 99—118 |
| 2,868,652 | 1/1959 | Brock | 99—118 |
| 2,999,022 | 9/1961 | Payne et al. | 99—118 |
| 3,011,896 | 12/1961 | Eber et al. | 99—118 |
| 3,097,098 | 7/1963 | Allen et al. | 99—123 |

FOREIGN PATENTS

| 613,298 | 1/1961 | Canada. |

A. LOUIS MONACELL, *Primary Examiner.*

ABRAHAM H. WINKELSTEIN, *Examiner.*